United States Patent
Favero

(10) Patent No.: US 11,939,522 B2
(45) Date of Patent: Mar. 26, 2024

(54) METHOD FOR ENHANCING OIL RECOVERY IN A SUBTERRANEAN CARBONATE FORMATION USING AN INJECTED AMPHOTERIC WATER-SOLUBLE POLYMER

(71) Applicant: S.P.C.M. SA, Andrezieux-Boutheon (FR)

(72) Inventor: Cédrick Favero, Andrezieux-Boutheon (FR)

(73) Assignee: S.P.C.M. SA, Andrezieux-Boutheon (FR)

( * ) Notice: Subject to any disclaimer, the term of this patent is extended or adjusted under 35 U.S.C. 154(b) by 0 days.

(21) Appl. No.: 17/924,187

(22) PCT Filed: May 21, 2021

(86) PCT No.: PCT/EP2021/063605
§ 371 (c)(1),
(2) Date: Nov. 9, 2022

(87) PCT Pub. No.: WO2021/239599
PCT Pub. Date: Dec. 2, 2021

(65) Prior Publication Data
US 2023/0193115 A1 Jun. 22, 2023

(30) Foreign Application Priority Data

May 26, 2020 (FR) ..................... 20 05554

(51) Int. Cl.
*C09K 8/588* (2006.01)
*C08F 220/58* (2006.01)
*C08F 220/60* (2006.01)
*C09K 8/584* (2006.01)
*E21B 43/16* (2006.01)

(52) U.S. Cl.
CPC .......... *C09K 8/588* (2013.01); *C08F 220/585* (2020.02); *C08F 220/60* (2013.01); *C09K 8/584* (2013.01); *E21B 43/16* (2013.01); *C08F 2800/10* (2013.01)

(58) Field of Classification Search
CPC .......... C09K 8/588; E21B 43/16; E21B 43/26
See application file for complete search history.

(56) References Cited

U.S. PATENT DOCUMENTS

| 6,691,715 | B2 | 2/2004 | Matz et al. | |
|---|---|---|---|---|
| 8,680,028 | B2 | 3/2014 | Braun et al. | |
| 10,913,670 | B2 * | 2/2021 | Painter | C02F 1/68 |
| 11,155,749 | B1 * | 10/2021 | Favero | E21B 43/20 |
| 2003/0022987 | A1 | 1/2003 | Matz et al. | |
| 2014/0238943 | A1 * | 8/2014 | Favero | C02F 1/56 |
| | | | | 210/732 |
| 2020/0079992 | A1 * | 3/2020 | Favero | C09K 8/80 |

FOREIGN PATENT DOCUMENTS

WO WO-2013138156 A1 * 9/2013 ................ C08F 2/22

OTHER PUBLICATIONS

International Search Report for PCT/EP2021/063605 dated Jul. 19, 2021.
Preliminary Search Report for FR 2005554 dated Feb. 8, 2021.

* cited by examiner

*Primary Examiner* — Silvana C Runyan
(74) *Attorney, Agent, or Firm* — B. Aaron Schulman, Esq.; Stites & Harbison, PLLC

(57) ABSTRACT

A method is provided for enhanced oil recovery in a subterranean carbonate formation by injecting an aqueous composition having at least one water-soluble polymer containing acrylamidopropyltrimethylammonium chloride (APTAC). The water soluble polymer used in the method is an amphoteric polymer and contains at least one anionic monomer, wherein the number of acrylamidopropyltrimethylammonium chloride units in the water-soluble polymer is between 20 and 99.9 mol percent relative to total number of moles of monomer units of the water-soluble polymer. The method is advantageous because it improves the efficacy of enhanced oil recovery in subterranean carbonate formations using specific water-soluble polymers.

14 Claims, No Drawings

METHOD FOR ENHANCING OIL RECOVERY IN A SUBTERRANEAN CARBONATE FORMATION USING AN INJECTED AMPHOTERIC WATER-SOLUBLE POLYMER

FIELD OF THE INVENTION

This invention concerns the field of enhanced oil recovery in a subterranean carbonate formation. More specifically, this invention concerns a method for enhanced oil recovery in a subterranean carbonate formation by injecting an aqueous composition comprising a water-soluble polymer containing acrylamidopropyltrimethylammonium chloride (APTAC).

PRIOR ART

Most oil fields currently under exploitation have become mature, and their production has in fact either begun to decline or are about to do so. The recovery rate of these fields is currently on the order of 15-35% on average relative to the initial amount of oil. Thus, they still offer considerable potential for production.

Generally, the crude oil contained in deposits is recovered in several periods of time.

Production first results from the natural energy of the fluids and rock decompressing. Following this depletion phase, the amount of oil recovered on the surface averages 5-15% of the initial reserve. Thus, in a second period, it is necessary to use techniques that seek to increase the recovery performance whilst maintaining the pressure of the field.

To this end, the most common method is to inject water into the deposit by means of dedicated injection wells. This is referred to as 'secondary recovery'. This second phase ends when the water/oil ratio is too high, i.e. once the amount of water in the mixture produced by the production wells is too great. This secondary recovery thus allows for an additional recovery rate on the order of 10-20%.

The other techniques that can be used are grouped under the umbrella of 'enhanced oil recovery' (EOR). Their objective is to recover an additional 10-35% of oil relative to the initial amount of oil. Various thermal and non-thermal techniques fall under the rubric of EOR, such as the electric, miscible, vapour, or chemical techniques for 'enhanced recovery of the oil' that remains (see *Oil & gas science and technology*—IFP, vol 63 (2008) no 1, pp 9-19)

'Oil' refers to oil of all types, i.e. both light and heavy or bituminous oil. Oil generally arises from the natural transformation of organic material, and consists of a mixture of hydrocarbons. In the description of the prior art and the invention, the terms 'petroleum' and 'oil' are used to refer to the same subject-matter.

More specifically, this invention concerns chemical EOR involving the injection of an aqueous injection fluid comprising at least one water-soluble polymer into a subterranean carbonate formation, wherein the fluid is suited to sweep the subterranean formation and thus to push the oil out of the rock.

It is known in the art that synthetic water-soluble polymers, in particular those based on acrylamide, are highly advantageous polymers for increasing the viscosity of aqueous solutions, and are in fact the most widely used in EOR.

Subterranean carbonate formations represent approximately half of oil reservoirs in the world. They are particularly rich in calcite and/or dolomite. The specific nature of these formations lies in the fact that the rocks have surfaces that tend to be wet more by oil than by water. This makes it difficult to treat and exploit these reservoirs using water-soluble polymers. Particularly complex phenomena related to the wetting of the rock and the interfacial tensions of the chemical compounds in contact with the rock make it difficult to exploit these subterranean formations.

In the specific case of subterranean carbonate formations, which generally have low permeability, acrylamide-based polymers offer limited performance. The document *Enhanced Oil Recovery Field Experiences in Carbonate Reservoirs in the United States*, E. Manrique, Center for Energy and Technology of the Americas (CETA) summarises the various experiences acquired with EOR in carbonate reservoirs. One of the technologies that has been used successfully is 'carbon dioxide flooding', i.e. injecting carbon dioxide into the reservoir. The other technique used is 'chemical flooding', i.e. EOR by injecting an aqueous polymer composition. Hydrolysed polyacrylamides as well as polysaccharides have been tested.

The problem this invention seeks to solve is to improve the efficacy of enhanced oil recovery in subterranean carbonate formations using specific water-soluble polymers.

DISCLOSURE OF THE INVENTION

The applicant has surprisingly found that this was possible by using a water-soluble polymer containing acrylamidopropyltrimethylammonium chloride (APTAC).

More specifically, this invention concerns a method for enhanced oil recovery in a subterranean carbonate formation by injecting an aqueous composition (or injection fluid) comprising at least one water-soluble polymer containing acrylamidopropyltrimethylammonium chloride (APTAC).

The invention also concerns an aqueous composition, also known as 'injection fluid', for use in a method for EOR in a subterranean carbonate formation comprising the water-soluble polymer.

'Water-soluble polymer' refers to a copolymer that provides an aqueous solution when dissolved with stirring at 25° C. and a concentration of 20 $g \cdot L^{-1}$ in water.

The number of APTAC units in the water-soluble polymer according to the invention is preferably between 20 and 100 mol % relative to the total number of moles of monomer units of the water-soluble polymer. More preferably, it is between 20 and 99.9 mol %, more preferably between 30 and 99 mol %, more preferably between 40 and 95 mol %, even more preferably between 50 and 90 mol %.

In a preferred embodiment of the invention, the water-soluble polymer further comprises at least one non-ionic, anionic, and/or zwitterionic monomer. The number of non-ionic, anionic, or zwitterionic monomer units in the water-soluble polymer is preferably between 0.1 and 70 mol % relative to the total number of moles of monomer units of the water-soluble polymer, preferably between 1 and 50 mol %, more preferably between 5 and 40 mol %, and even more preferably between 5 and 20 mol %.

Preferably, the anionic monomers are selected from acrylic acid, methacrylic acid, itaconic acid, crotonic acid, maleic acid, fumaric acid, sulphonated monomers, phosphonated monomers, 2-acrylamido-2-methylpropanesulphonic acid (ATBS), vinylsulphonic acid, vinylphosphonic acid, allylsulphonic acid, allylphosphonic acid, wherein the anionic monomer is not in salt form or partially or totally in salt form. Preferred anionic monomers are acrylic acid, sulphonated monomers, phosphonated monomers, 2-acrylamido-2-methylpropanesulphonic acid, and salts thereof.

The preferred anionic monomer is 2-acrylamido-2-methyl-propanesulphonic acid and salts thereof.

Preferably, the non-ionic monomers are selected from acrylamide, methacrylamide, N-isopropylacrylamide, N,N-dimethylacrylamide and N-methylolacrylamide, N-vinylformamide, N-vinylacetamide, acryloyl morpholine (ACMO), and diacetone acrylamide. A preferred non-ionic monomer is acrylamide.

In a preferred embodiment, the water-soluble polymer is an amphoteric polymer containing APTAC and at least one anionic monomer. Preferably, the anionic monomer is selected from the aforementioned anionic monomers. The same preferences apply. Advantageously, the anionic monomer is ATBS and salts thereof.

Advantageously, such a water-soluble polymer has very high stability at temperatures over 80° C., preferably between 90 and 130° C.

Thus, advantageously, this invention allows for enhanced oil recovery in subterranean carbonate formations, in particular, at temperatures above 80° C., preferably between 90 and 130° C.

In a preferred embodiment of the invention, the water-soluble polymer further comprises at least one non-ionic and/or zwitterionic monomer. The number of non-ionic or zwitterionic monomer units in the water-soluble polymer is preferably between 0.1 and 70 mol % relative to the total number of moles of monomer units of the water-soluble polymer, preferably between 1 and 50 mol %, more preferably between 5 and 40 mol %, and even more preferably between 5 and 20 mol %.

The water-soluble polymer may further contain another cationic monomer, but it is highly preferable for the water-soluble polymer not to contain cationic monomers other than APTAC.

Other possible cationic monomers include quaternised dimethylaminoethyl acrylate (DMAEA), quaternised dimethylaminoethyl methacrylate (DMAEMA), dimethyldiallylammonium chloride (DADMAC), and methacrylamidopropyltrimethylammonium chloride (MAPTAC).

In a particularly preferred embodiment, the water-soluble polymers offering the best performance in subterranean carbonate formations are amphoteric polymers of APTAC and ATBS and/or a salt thereof. ATBS monohydrate, as described in WO 2018/172676, may be advantageously used.

In this embodiment, the number of APTAC units is preferably between 30 and 95 mol % relative to the total number of moles of monomer units of the water-soluble polymer, preferably between 60 and 80 mol %, and that of the units of ATBS and/or one of its salts is preferably between 5 and 70 mol %, preferably between 20 and 60 mol %, more preferably between 20 and 50 mol %, and even more preferably between 25 and 40 mol %.

Throughout the invention, it is understood that the sum of the percentages of monomers in the polymer is equal to 100%.

In this embodiment, and preferably, the water-soluble polymers are polymers that do not contain monomer units other than APTAC and ATBS and/or one of its salts. In this application, branching agents having at least two unsaturated ethylene moieties such as methylene-bis-acrylamide are not considered monomer units, as they are limited to monomers having a single unsaturated ethylene moiety.

Preferably, the water-soluble polymer has a weight-average molecular weight between 1 and 15 million g/mol.

The weight-average molecular weight is determined by the intrinsic viscosity of the water-soluble polymer. The intrinsic viscosity can be measured by known-art methods, and may be calculated based on reduced viscosity values for various concentrations of water-soluble polymer by a graphic method consisting of obtaining the reduced viscosity values (ordinate axis) as a function of concentration (abscissa axis) and extrapolating the curve up to a concentration of nil. The intrinsic viscosity value is reported on the ordinate axis or using the least-squares method. The molecular weight can then be determined by the Mark-Houwink equation:

$$[\eta]=K \cdot M^{\alpha}$$

$[\eta]$ represents the intrinsic viscosity of the water-soluble polymer as determined by measuring viscosity in solution, K represents an empirical constant ($K=3.73 \cdot 10^{-4}$), M represents the molecular weight of the water-soluble polymer, $\alpha$ represents the Mark-Houwink coefficient ($\alpha=+0.66$), K and $\alpha$ depend on the particular water-soluble polymer/solvent system.

The water-soluble polymer may be obtained by radical polymerisation. Polymerisation techniques such as the RAFT controlled radical polymerization method (reversible-addition fragmentation chain transfer), NMP (nitroxide-mediated polymerisation), or ATRP (atom transfer radical polymerisation) may be used to obtain the water-soluble polymer.

The water-soluble polymer used may have a linear, branched, star, or comb structure. These structures may be obtained by selecting the initiator, transfer agent, and the polymerisation technique.

Generally, the water-soluble polymer does not require the development of a particular polymerisation method. Indeed, it can be obtained using all known-art polymerisation techniques. In particular, this may be solution polymerisation, gel polymerisation, precipitation polymerisation, emulsion polymerisation (aqueous or inverse), suspension polymerisation, reactive extrusion polymerisation, water-in-water polymerisation, or micellar polymerisation.

The polymerisation is preferably carried out by the reverse emulsion method, with or a without subsequent concentration step, or by the gel method.

According to the invention, the water-soluble polymer may be in liquid, gel, or solid (powder or bead) form when its preparation includes a step of drying such as spray drying, tumble drying, radiation drying such as microwave drying, or fluidised-bed drying.

Surprisingly, the applicant has found that the water-soluble polymer according to the invention is particularly well suited for use in EOR methods in subterranean carbonate formations that are particularly rich in calcite and/or dolomite.

Preferably, in the method for EOR according to the invention, the subterranean carbonate formation contains at least 20% carbonates, preferably at least 30 carbonates, more preferably at least 50% carbonates. The percentage of carbonates corresponds to the carbonated rock content of the formation.

The presence of APTAC monomer units in the water-soluble polymer allows for significant improvements in EOR in these subterranean carbonate formations.

The water-soluble polymer is particularly effective when it also comprises monomer units of ATBS and/or one of its salts.

Preferably, in the method according to the invention, the aqueous composition injected into the subterranean carbonate formation comprises between 50 and 50 000 ppm water-soluble polymer, preferably between 100 and 30 000 ppm, more preferably between 500 and 10 000 ppm relative to the weight of the aqueous composition.

The water-soluble polymer is advantageously processed on-site, immediately prior to being injected into the deposit. Generally, all components introduced into the water or brine to form the injection fluid are most frequently added on a circulation line of the aqueous solution or brine.

When the water-soluble polymer is in particle form, it may be dissolved in an aqueous medium in a dispersion device. One example of a dispersion device is the polymer slicing unit (PSU) described in document U.S. Pat. No. 8,186,871, which makes it possible to prepare a concentrated aqueous polymer composition.

Other than the water-soluble polymer, the aqueous composition may also comprise one or more chemical compounds useful for EOR and well known to persons skilled in the art.

These chemical compounds include mineral or organic alkaline agents, having weak, strong, or super-strong bases that are capable of saponifying the crude oil and forming oil-solubilising surfactant species in situ. Examples include sodium carbonate, caustic soda, borate and metaborate compounds, amines, and basic polymer species.

Another family of compounds widely injected with polymers is that of the surfactant compounds, which are commonly anionic, zwitterionic, cationic, and, sometimes, non-ionic. These compounds are rarely injected in pure form; instead, they are injected with a co-surfactant and a co-solvent to improve their compatibility and efficacy in the reservoir.

Surfactants may be cationic and selected from quaternary ammonium salts, phosphonium salts, iodonium salts, and iodonium salts (sic). They may be non-ionic and selected from glycerol esters, glycol esters, polyoxyethylene glycol esters, sorbitan esters and derivatives thereof, ethoxylated alcohols, alkoxylated alcohols, fatty alcohol ethers, and polyoxyethylene glycols.

When the aqueous composition comprises at least one surfactant, the composition comprises between 0.01 and 8 wt % of surfactants.

Persons skilled in the art will know how to select the appropriate surfactants, alkaline agents, and bases based on the nature of the subterranean formation being treated.

The water or brine used to prepare the aqueous composition may be production water. 'Production water' refers to all salt or non-salt waters, brines, seawater, and aquifer water arising from a hydrocarbon reservoir. This production water may be treated prior to the preparation of the injection fluid, as described in patent application WO 2018/020175.

Advantageously, at the time of injection, the aqueous composition has a viscosity between 1 and 200 cps (centipoise) (viscosity measurement at 20° C. with a Brookfield viscosimeter having a UL module and a speed of 6 rpm).

Preferably, the method according to the invention generally comprises the following steps:
  preparing an aqueous composition comprising at least one water-soluble polymer according to the invention,
  injecting the aqueous composition into a subterranean carbonate formation,
  sweeping the subterranean carbonate formation by means of the injected aqueous composition,
  recovering a mixture of water and oil and/or gas.

Preferably, the method may be a surfactant polymer (SP), alkaline polymer (AP), or alkaline surfactant polymer (ASP) EOR method comprising the injection of surfactants and/or alkaline agents. Indeed, the use of surfactants and/or alkaline agents allows for improvements in oil recovery, particularly in subterranean carbonate formations. These compounds may be added to the aqueous composition according to the invention or injected separately, before or after.

The invention also concerns an aqueous composition or injection fluid for use in a method for EOR in a subterranean carbonate formation comprising a water-soluble polymer according to the invention. The injection fluid (or aqueous composition) comprises at least one water-soluble polymer according to the invention and at least water or a brine. Optionally, it comprises other components, e.g. an alkaline agent as described above, one or more surfactants as described above, co-solvents, or other water-soluble polymers.

The invention and its benefits will be made clearer by the following examples, which are provided by way of example only and without limitation.

EXAMPLES

Example 1: Obtaining Polymers

|  | ATBS | NVP | AM | DADMAC | EO | APTAC |
|---|---|---|---|---|---|---|
| Polymer 1 (comparative) | 100 |  |  |  |  |  |
| Polymer 2 (comparative) | 35 | 35 | 30 |  |  |  |
| Polymer 3 (comparative) |  |  | 70 | 30 |  |  |
| Polymer 4 (comparative) |  |  |  | 100 |  |  |
| Polymer 5 (comparative) |  |  |  |  |  | 100 |
| Polymer 6 (invention) | 33 |  |  |  |  | 67 |
| Polymer 7 (invention) | 50 |  |  |  |  | 50 |
| Polymer 8 (invention) | 67 |  |  |  |  | 33 |
| Polymer 9 (comparative) |  | 50 |  |  |  | 50 |
| Polymer 10 (comparative) |  |  |  |  | 50 | 50 |

Polymers are prepared by gel polymerisation. Powders are obtained for each of the polymers, the monomer composition of which is shown in table 1.

Table 1—Monomer Composition of Polymers by Mole Percent

ATBS: 2-Acrylamido 2-methylpropanesulphonic acid
NVP: N-Vinyl Pyrrolidone
AM: Acrylamide
DADMAC: Dimethyldiallylammonium chloride
APTAC: Acrylamidopropyltrimethylammonium chloride Example 2: Evaluation of Polymer Properties The polymers are subjected to various tests to evaluate their injectability into the subterranean formation (filter ratio), their ability to contribute to the viscosity of the injection fluid, including in high-salinity and high-temperature conditions (Brookfield viscosity), and their efficacy in a carbonate field (adsorption).

'Filter ratio' (FR) refers to a test that determines the performance of a polymer solution in conditions approaching the permeability of the deposit, and consists of measuring the time taken by a given volume/concentration of solution to pass through a filter. Generally, the FR compares the filterability of the polymer solution for two consecutive equivalent volumes, indicating the tendency of the solution to clog the filter. Lower FR values indicate better performance.

The test used to determine FR consists of measuring the time taken by a given volume of solution with 1000 ppm active polymer to flow through a filter. The solution is contained in a pressurised cell at a pressure of 2 bar, and the filter is 47 mm in diameter, with a pore size of 1.2 µm.

The time required to obtain 100 ml (t100 ml), 200 ml (t200 ml), and 300 ml (t300 ml) of filtrate are thus measured, defining an FR expressed as:

$$FR = (t300\ ml - t200\ ml)/(t200\ ml - t100\ ml)$$

The time measurements are exact to 0.1 s.

The FR thus represents the ability of the polymer solution to clog the filter with two consecutive equivalent volumes.

The 25° C. viscosity measurement is carried out using a Brookfield viscosimeter with UL module at 6 RPM (7.34 $s^{-1}$) at 25° C. on a solution containing 5 g/l polymer, with the polymer dissolved in water. The viscosity measurement is carried out in anaerobic conditions in a glove box.

The brine viscosity measurement is carried out in the same conditions, except that the measurement temperature is 70° C., and the polymer is processed in a brine containing 10 g/l NaCl and 1 g/l $CaCl_2$. The viscosity measurement is carried out in anaerobic conditions in a glove box.

The viscosity results are expressed in cps. The greater the viscosity, the better the oil sweeping performance in the subterranean formation.

Thermal stability corresponds to the percentage of viscosity conserved at 25° C., after 6 months of storage of a 4.5 g/l polymer solution in a brine containing 75.984 g/l NaCl, 22.42 g/l $CaCl_2$, $2H_2O$, and 13.475 g/l $MgCl_2$, $6H_2O$, at a temperature of 100 or 120° C. The viscosity measurements are carried out in the same conditions as the 25° C. viscosity measurements described supra. The greater the percentage, the better the sweeping performance in these temperature conditions.

Adsorption in a carbonate environment is measured by the method described infra. The test consists of injecting a 1000 ppm polymer into a carbonate rock core and determine the amount of polymer adsorbed to the surface of the carbonate rock compared to the proportion of polymer that passed through the core. More specifically, two injections of the polymer solution under evaluation are carried out in a core of the carbonate rock in question.

The carbonate rock on which the tests are conducted is an Estaillades carbonate rock, a well-known reference having the following characteristics: permeability: 120 mD, porosity (porous volume): 30.7%, and having the following composition:
  Quartz: 0.3 mass %;
  Calcite: 99.4 mass %;
  Apatites: 0.2 mass %;
  Barite: 0.1 mass %;

First of all, the carbonate rock core, 2.5 cm in diameter and 15 cm in length, is saturated under vacuum with the same brine as described above, previously filtered and deoxygenated and then placed in an injection cell in a porous medium, itself connected to the testing device.

Then, a first injection of the polymer solution is made at a constant flow rate of 5 ml/h. The volume of this injected is set at 5× the porous volume of the rock in question.

Then, a volume of brine corresponding to 25× the porous volume of the rock in question is injected at a constant flow rate of 5 ml/h to displace the non-adsorbed polymer out of the rock.

Lastly, a second injection of the polymer solution is made at a constant flow rate of 5 ml/h. The volume of this front is set at 5× the porous volume of the rock in question.

Upon each injection of the polymer solution, the effluents from the core are collected in the form of 4 ml fraction. For each effluent fraction collected, the concentration of the polymer solution is determined in order to establish the breakthrough curves of the polymer solution for each injection.

The difference in breakthrough volume at 50% of the concentration injected between the two polymer injections is then used to determine the quantity of polymer adsorbed in µg polymer/g rock.

The adsorption is then expressed in µg/g, and a low value is advantageous, because it shows the greatest tendency of the polymer to be adsorbed and thus immobilised by the carbonate rock. A lower adsorption thus allows more polymers to participate in the sweeping of the formation and, de facto, to increase the oil recovery performance in a carbonate field.

The results are shown in table 2 below.

TABLE 2

| | Polymer performance | | | | | |
|---|---|---|---|---|---|---|
| | FR | Viscosity at 25° C. (cps) | Brine viscosity (cps) | Thermal stability at 100° C. in % | Thermal stability at 120° C. in % | Adsorption in µg/g |
| Polymer 1 (comparative) | 1.5 | 20 | 12 | 100 | 80 | 90 |
| Polymer 2 (comparative) | 1.8 | 17 | 8 | 100 | 80 | 80 |
| Polymer 3 (comparative) | 2.6 | 5 | 2 | 30 | 0 | 100 |
| Polymer 4 (comparative) | 3.0 | 7 | 4 | 90 | 75 | 120 |
| Polymer 5 (comparative) | 1.5 | 16 | 8 | 50 | 20 | 30 |
| Polymer 6 (invention) | 1.3 | 17 | 9 | 80 | 65 | 20 |
| Polymer 7 (invention) | 1.4 | 18 | 10 | 85 | 75 | 40 |
| Polymer 8 (invention) | 1.4 | 19 | 10 | 90 | 80 | 60 |
| Polymer 9 (comparative) | 1.6 | 9 | 6 | 90 | 80 | 115 |
| Polymer 10 (comparative) | 2.2 | 8 | 5 | 85 | 75 | 125 |

These results show that the water-soluble polymers according to the invention 6, 7, and 8 are the only ones that simultaneously offer good performance in carbonate rock and good sweeping properties, including in high-salinity conditions, whilst maintaining good stability at 100 and 120° C.

Indeed, carbonate fields are often high-temperature fields. The temperature resistance of the polymers is thus taken into account for these specific cases. Although polymers 1 and 2 (comparative) (and 9 and 10, to a lesser extent) offer excellent temperature resistance, the results show that they are not very effective in carbonate fields.

The examples according to the invention, on the other hand, offer better performance in carbonate fields without excessive compromises in terms of temperature resistance. The performance of polymer 5 in the carbonate field is very good, but has less thermal stability than polymers 6, 7, and 8. Thus, it would be suited to a carbonate field with a lower temperature.

The invention claimed is:

1. A method for enhancing oil recovery in a subterranean carbonate formation comprising injecting into said subterranean carbonate formation an aqueous composition comprising at least one water-soluble polymer, wherein the water-soluble polymer is an amphoteric polymer containing acrylamidopropyltrimethylammonium chloride and at least one anionic monomer, and wherein the acrylamidopropyltrimethylammonium chloride in the water-soluble polymer has a number of polymeric units comprising between 20 and 99.9 mol % relative to total number of moles of monomer units of the water-soluble polymer.

2. The method according to claim 1, wherein the anionic monomer has a number of monomeric units in the water-soluble polymer between 0.1 and 70 mol % relative to the total number of moles of monomer units of the water-soluble polymer.

3. The method according to claim 1, wherein the water-soluble polymer is an amphoteric polymer of acrylamidopropyltrimethylammonium chloride and of at least one anionic monomer, wherein the anionic monomer is selected from the group consisting of acrylic acid, methacrylic acid, itaconic acid, crotonic acid, maleic acid, fumaric acid, sulphonated monomers, phosphonated monomers, 2-acrylamido-2-methylpropanesulphonic acid, vinylsulphonic acid, vinylphosphonic acid, allylsulphonic acid and allylphosphonic acid, wherein the anionic monomer is not in salt form or partially or totally in salt form.

4. The method according to claim 1, wherein the water-soluble polymer further comprises at least one non-ionic monomer or at least one zwitterionic monomer.

5. The method according to claim 1, wherein the water-soluble polymer is an amphoteric polymer of acrylamidopropyltrimethylammonium chloride and 2-acrylamido-2-methylpropanesulphonic acid, or a salt thereof.

6. The method according to claim 1, wherein the water-soluble polymer does not contain cationic monomers other than acrylamidopropyltrimethylammonium chloride.

7. The method according to claim 1, wherein the water-soluble polymer has an average molecular weight between 1 and 15 million g/mol.

8. The method according to claim 1, wherein the aqueous composition comprises between 50 and 50 000 ppm of water-soluble polymer.

9. The method according to claim 1, wherein the subterranean carbonate formation contains at least 20% carbonates.

10. The method according to claim 1, wherein the method comprises:
preparing an aqueous composition comprising at least one water-soluble polymer,
injecting the aqueous composition into a subterranean carbonate formation,
sweeping the subterranean carbonate formation using the injected aqueous composition, and
recovering a mixture of water and oil and/or gas.

11. The method according to claim 1, wherein the method further comprises injecting a surfactant or an alkaline agent selected from the group consisting of a surfactant polymer, an alkaline polymer, and an alkaline surfactant polymer.

12. An injection fluid for use in a method for enhancing oil recovery in a subterranean carbonate formation comprising a water-soluble polymer according to claim 1.

13. The method according to claim 1, wherein the water-soluble polymer further comprises at least one non-ionic monomer and at least one zwitterionic monomer.

14. The method according to claim 1, wherein the method further comprises injecting a surfactant and an alkaline agent, wherein the surfactant and alkaline agent are selected from the group consisting of a surfactant polymer, an alkaline polymer, and an alkaline surfactant polymer.

* * * * *